US012441089B2

(12) United States Patent
Furuta et al.

(10) Patent No.: US 12,441,089 B2
(45) Date of Patent: Oct. 14, 2025

(54) DECORATIVE BOARD, TRANSPARENT RESIN FILM, AND DECORATIVE BOARD PRODUCTION METHOD (71) Applicant: Dai Nippon Printing Co., Ltd., Tokyo (JP)

(72) Inventors: Satoshi Furuta, Tokyo (JP); Ryo Fujii, Tokyo (JP); Tomomi Nakajima, Tokyo (JP); Yoshiaki Netsu, Tokyo (JP); Toshinaru Kayahara, Tokyo (JP); Yosuke Sumida, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 44 days.

(21) Appl. No.: 17/283,662

(22) PCT Filed: Sep. 30, 2019

(86) PCT No.: PCT/JP2019/038597
§ 371 (c)(1),
(2) Date: Apr. 8, 2021

(87) PCT Pub. No.: WO2020/075561
PCT Pub. Date: Apr. 16, 2020

(65) Prior Publication Data
US 2022/0009207 A1 Jan. 13, 2022

(30) Foreign Application Priority Data

Oct. 12, 2018 (JP) .................................. 2018-193828
Oct. 12, 2018 (JP) .................................. 2018-193829

(51) Int. Cl.
*B32B 21/08* (2006.01)
*B32B 3/30* (2006.01)
(Continued)

(52) U.S. Cl.
CPC ................ *B32B 21/08* (2013.01); *B32B 3/30* (2013.01); *B32B 7/12* (2013.01); *B32B 21/02* (2013.01);
(Continued)

(58) Field of Classification Search
CPC .. B32B 21/08; B32B 3/30; B32B 7/12; B32B 21/02; B32B 27/08; B32B 27/16; B32B 27/32
See application file for complete search history.

(56) References Cited

U.S. PATENT DOCUMENTS 6,551,687 B1 4/2003 Sato et al.
6,863,956 B1 3/2005 Nakajima et al.
(Continued)

FOREIGN PATENT DOCUMENTS

CN 101279506 A 10/2008
CN 102129092 A 7/2011
(Continued)

OTHER PUBLICATIONS

Espacenet Translation of JP-2012035513-A (Year: 2023).*
(Continued)

*Primary Examiner* — Michael Zhang
(74) *Attorney, Agent, or Firm* — Troutman Pepper Locke LLP (57) ABSTRACT The present invention provides a decorative board capable of exhibiting excellent weather resistance even in a depression of a pattern of protrusions and depressions even in a case where the pattern of protrusions and depressions is formed on the outermost surface of a transparent resin film, a transparent resin film, and a method for producing a decorative board. Provided is a decorative board including: a substrate; a picture layer; and a transparent resin film, in a stated order in a thickness direction, the transparent resin (Continued)

film comprising at least a thermoplastic resin layer and having a pattern of protrusions and depressions on a side opposite to a picture layer side, the decorative board further comprising at least one layer containing an ultraviolet absorber between the picture layer and the thermoplastic resin layer.

16 Claims, 1 Drawing Sheet

(51) Int. Cl.
*B32B 7/12* (2006.01)
*B32B 21/02* (2006.01)
*B32B 27/08* (2006.01)
*B32B 27/16* (2006.01)
*B32B 27/32* (2006.01)
*B32B 37/12* (2006.01)
*B32B 38/00* (2006.01)
*B32B 38/06* (2006.01)
*B44C 1/16* (2006.01)
*E04F 13/08* (2006.01)

(52) U.S. Cl.
CPC .............. *B32B 27/08* (2013.01); *B32B 27/16* (2013.01); *B32B 27/32* (2013.01); *B32B 37/12* (2013.01); *B32B 38/0008* (2013.01); *B32B 38/06* (2013.01); *B44C 1/16* (2013.01); *E04F 13/0866* (2013.01); *E04F 13/0873* (2013.01); *B32B 2250/03* (2013.01); *B32B 2255/10* (2013.01); *B32B 2255/26* (2013.01); *B32B 2255/28* (2013.01); *B32B 2307/412* (2013.01); *B32B 2307/71* (2013.01); *B32B 2307/712* (2013.01); *B32B 2310/14* (2013.01); *B32B 2317/16* (2013.01); *B32B 2323/10* (2013.01); *B32B 2451/00* (2013.01)

(56) References Cited

U.S. PATENT DOCUMENTS

| | | |
|---|---|---|
| 2004/0191482 A1 | 9/2004 | Nakajima et al. |
| 2005/0287341 A1 | 12/2005 | Nakajima et al. |
| 2006/0182984 A1 | 8/2006 | Abele et al. |
| 2007/0042160 A1 | 2/2007 | Nakajima et al. |
| 2007/0231550 A1 | 10/2007 | Stenzel |
| 2008/0051495 A1 | 2/2008 | Murakami et al. |
| 2009/0076185 A1 | 3/2009 | Berit-Debat et al. |
| 2010/0291317 A1 | 11/2010 | Imaoku et al. |
| 2011/0045284 A1* | 2/2011 | Matsukawa .............. B32B 27/20 428/336 |
| 2011/0052880 A1* | 3/2011 | Iizuka .................... B44C 5/0469 264/132 |
| 2011/0091690 A1 | 4/2011 | Lin et al. |
| 2011/0151208 A1 | 6/2011 | Huang et al. |
| 2011/0263764 A1 | 10/2011 | Tishkov et al. |
| 2014/0349096 A1* | 11/2014 | Miyazaki ................ B32B 15/04 428/216 |
| 2016/0076528 A1 | 3/2016 | Kato et al. |
| 2016/0089849 A1 | 3/2016 | Kayanoki et al. |
| 2016/0325535 A1* | 11/2016 | Ueno ...................... B32B 27/36 |
| 2019/0047246 A1 | 2/2019 | Bayer et al. |
| 2019/0202192 A1 | 7/2019 | Sekino et al. |
| 2019/0248100 A1 | 8/2019 | Horio et al. |
| 2021/0283879 A1* | 9/2021 | Ueno ...................... B32B 27/308 |
| 2022/0001645 A1* | 1/2022 | Fujii .......................... B44C 5/04 |
| 2022/0118735 A1 | 4/2022 | Fujii et al. |

FOREIGN PATENT DOCUMENTS

| | | | | |
|---|---|---|---|---|
| CN | 105142903 A | 12/2015 | | |
| CN | 105459526 A | 4/2016 | | |
| CN | 108284654 A | 7/2018 | | |
| EP | 3098071 A1 | 11/2016 | | |
| EP | 3210772 A1 | 8/2017 | | |
| EP | 3446873 A1 | 2/2019 | | |
| EP | 3521017 A1 | 8/2019 | | |
| EP | 3865297 A1 | 8/2021 | | |
| JP | H07-256752 A | 10/1995 | | |
| JP | H09-141812 A | 6/1997 | | |
| JP | H10-211675 A | 8/1998 | | |
| JP | H10-217407 A | 8/1998 | | |
| JP | H11-115106 A | 4/1999 | | |
| JP | H11-157297 A | 6/1999 | | |
| JP | 2000-015768 A | 1/2000 | | |
| JP | 2000-289162 A | 10/2000 | | |
| JP | 2000-335628 A | 12/2000 | | |
| JP | 2000-343649 A | 12/2000 | | |
| JP | 2001-150540 A | 6/2001 | | |
| JP | 2002-036467 A | 2/2002 | | |
| JP | 2003-056168 A | 2/2003 | | |
| JP | 2004-090507 A | 3/2004 | | |
| JP | 2005-120255 A | 5/2005 | | |
| JP | 2005-154762 A | 6/2005 | | |
| JP | 2005313142 A | * | 11/2005 | |
| JP | 2006-068947 A | 3/2006 | | |
| JP | 2006-077173 A | 3/2006 | | |
| JP | 2006-306020 A | 11/2006 | | |
| JP | 2007-090797 A | 4/2007 | | |
| JP | 2007-106056 A | 4/2007 | | |
| JP | 2007-297568 A | 11/2007 | | |
| JP | 2008238601 A | * | 10/2008 | |
| JP | 2010-069709 A | 4/2010 | | |
| JP | 2012035513 A | * | 2/2012 | |
| JP | 2012076347 A | * | 4/2012 | |
| JP | 2012-106506 A | 6/2012 | | |
| JP | 2013-104923 A | 5/2013 | | |
| JP | 2015074091 A | 4/2015 | | |
| JP | 2016-035036 A | 3/2016 | | |
| JP | 2016-074162 A | 5/2016 | | |
| JP | 2016-168711 A | 9/2016 | | |
| JP | 2016190480 A | * | 11/2016 | ............ B29C 35/02 |
| JP | 2016210141 A | * | 12/2016 | |
| JP | 2017035011 A | * | 2/2017 | ............... B32B 1/00 |
| JP | 2017-042975 A | 3/2017 | | |
| JP | 2017-155227 A | 9/2017 | | |
| JP | 2017-185773 A | 10/2017 | | |
| JP | 2018-058284 A | 4/2018 | | |
| JP | 2018-089970 A | 6/2018 | | |
| JP | 2019-052262 A | 4/2019 | | |
| JP | 2019-511970 A | 5/2019 | | |
| JP | 2019-155777 A | 9/2019 | | |
| JP | 2020-062879 A | 4/2020 | | |
| JP | 2020-111062 A | 7/2020 | | |
| TW | 201114624 A | 5/2011 | | |
| TW | 201827223 A | 8/2018 | | |
| WO | 2018/062299 A1 | 4/2018 | | |
| WO | 2018/062340 A1 | 4/2018 | | |

OTHER PUBLICATIONS

Espacenet Translation of JP2012076347A (Year: 2023).*
Espacenet Translations of JP-2005313142-A (Year: 2023).*
Espacenet Translation of JP-2016210141-A (Year: 2023).*
Espacenet Translation of JP-2008238601-A (Year: 2024).*
"Technical materials, Various characteristics of plastic materials," Tonichi Kyosan Cable, Ltd., pp. 93-94 and information sheet in English.
Written Opinion of the ISA mailed Jun. 16, 2020, issued for PCT/JP2020/012394.

* cited by examiner

DECORATIVE BOARD, TRANSPARENT RESIN FILM, AND DECORATIVE BOARD PRODUCTION METHOD

CROSS REFERENCE TO RELATED APPLICATIONS

This application is related to three co-pending applications: "TRANSPARENT RESIN FILM, DECORATIVE BOARD, AND METHOD FOR PRODUCING DECORATIVE BOARD" filed even date herewith in the names of Satoshi Furuta, Ryo Fujii, Tomomi Nakajima, Yoshiaki Netsu, Toshinaru Kayahara and Yosuke Sumida as a national phase entry of PCT/JP2019/038603; "TRANSPARENT RESIN FILM, DECORATIVE BOARD, AND METHOD FOR PRODUCING DECORATIVE BOARD" filed even date herewith in the names of Ryo Fujii, Satoshi Furuta, Tomomi Nakajima, Yoshiaki Netsu, Toshinaru Kayahara and Yosuke Sumida as a national phase entry of PCT/JP2019/038606; and "TRANSPARENT RESIN FILM, DECORATIVE BOARD, AND METHOD FOR PRODUCING DECORATIVE BOARD" filed even date herewith in the names of Satoshi Furuta, Ryo Fujii, Tomomi Nakajima, Yoshiaki Netsu, Toshinaru Kayahara and Yosuke Sumida as a national phase entry of PCT/JP2019/038611; which applications are assigned to the assignee of the present application and all three incorporated by reference herein.

TECHNICAL FIELD

The present invention relates to a decorative board, a transparent resin film, and a method for producing a decorative board.

BACKGROUND ART

A recent spread of ink-jet printing methods using inkjet printers has enabled production of decorative boards used for applications such as building materials or decorative molded articles of many kinds in small quantities and printing of complicated patterns (e.g., letters, numbers, and graphics) as picture layers.

The ink-jet printing methods advantageously enable printing not only on film substrates but also on substrates having flat surfaces, projections and depressions, and curved surfaces.

Since a picture layer prepared by an ink-jet printing method is provided on the outermost surface of the substrate, a transparent resin film is necessarily provided for the purpose of protecting the picture layer having insufficient surface properties such as scratch resistance, stain resistance, and weather resistance.

As such a transparent resin film, Patent Literature 1 discloses an overlaminate film including: a transparent polypropylene film containing a triazine ultraviolet absorber and a hindered amine light stabilizer; a protective layer on one side of the film; and an adhesive layer on the other side of the film.

A decorative board including a conventional transparent resin film can have better design properties when the transparent resin film has a pattern of protrusions and depressions. However, the presence of the pattern of protrusions and depressions causes variations in thickness of the transparent resin film, resulting in variations in weather resistance. In particular, the weather resistance may be poor at a thin part of the transparent resin film, which leaves room for improvement. Such a tendency is remarkable particularly for picture layers prepared by ink-jet printing methods in which a wide variety of ink is used.

CITATION LIST

Patent Literature

Patent Literature 1: JP 2005-120255 A

SUMMARY OF INVENTION

Technical Problem

The present invention aims to provide a decorative board capable of exhibiting excellent weather resistance even in a depression of a pattern of protrusions and depressions even in a case where the pattern of protrusions and depressions is formed on the outermost surface of a transparent resin film, a transparent resin film, and a method for producing a decorative board.

Solution to Problem

The present inventors made intensive studies to solve the above problem, and found out that a decorative board excellent in weather resistance even in the case of having a pattern of protrusions and depressions on the surface can be provided when the decorative board includes a substrate, a picture layer, and a transparent resin film in the stated order in the thickness direction, wherein the transparent resin film includes at least a thermoplastic resin layer and has a pattern of protrusions and depressions on a side opposite to the picture layer side, and the decorative board further includes at least one layer containing an ultraviolet absorber between the picture layer and the thermoplastic resin layer. Thus, the present invention was completed.

The present invention relates to a decorative board including: a substrate; a picture layer; and a transparent resin film, in a stated order in a thickness direction, the transparent resin film including at least a thermoplastic resin layer and having a pattern of protrusions and depressions on a side opposite to a picture layer side, the decorative board further including at least one layer containing an ultraviolet absorber between the picture layer and the thermoplastic resin layer.

In the decorative board of the present invention, the transparent resin film preferably has a thickness at a depression of the pattern of protrusions and depressions of 80 µm or larger.

The transparent resin film preferably has the pattern of protrusions and depressions on the picture layer side.

The pattern of protrusions and depressions on the picture layer side of the transparent resin film preferably has an Rzmax defined in JIS B 0601 (2001) of 80 µm or smaller.

The decorative board preferably further includes an adhesive layer between the picture layer and the transparent resin film.

The adhesive layer preferably has a thickness of 10 µm or larger and the thickness is larger than the Rzmax defined in JIS B 0601(2001) of the pattern of protrusions and depressions on the picture layer side of the transparent resin film.

The adhesive layer is preferably the layer containing an ultraviolet absorber.

The adhesive layer preferably contains an ultraviolet absorber in an amount of 0.5% by mass or more and 2% by mass or less.

The ultraviolet absorber in the adhesive layer is preferably a triazine ultraviolet absorber.

The transparent resin film preferably has an adhesion primer layer on the picture layer side of the thermoplastic resin layer.

The adhesion primer layer is preferably the layer containing an ultraviolet absorber.

The ultraviolet absorber in the adhesion primer layer is preferably a triazine ultraviolet absorber.

The adhesion primer layer preferably has a thickness of 0.5 μm or larger and 10 μm or smaller.

A transparent resin film of the present invention is preferably used for protecting a picture layer provided on one side of a substrate.

A method for producing a decorative board of the present invention includes: forming an adhesive layer on a picture layer side of a transparent resin film; and bonding the transparent resin film and the picture layer with the adhesive layer.

Advantageous Effects of Invention

The decorative board of the present invention is excellent in weather resistance even in the case where a pattern of protrusions and depressions is formed on the outermost surface of a transparent resin film.

The transparent resin film of the present invention can impart excellent weather resistance to a decorative board.

DESCRIPTION OF EMBODIMENTS

A description is given on the decorative board of the present invention hereinbelow.

The decorative board of the present invention includes a substrate, a picture layer, and a transparent resin film in the stated order in the thickness direction. The transparent resin film includes at least a thermoplastic resin layer and has a pattern of protrusions and depressions on the side opposite to the picture layer side. The decorative board of the present invention further includes at least one layer containing an ultraviolet absorber between the picture layer and the thermoplastic resin layer.

A preferred example of the decorative board of the present invention is described with reference to FIG. 1.

Figure 1:
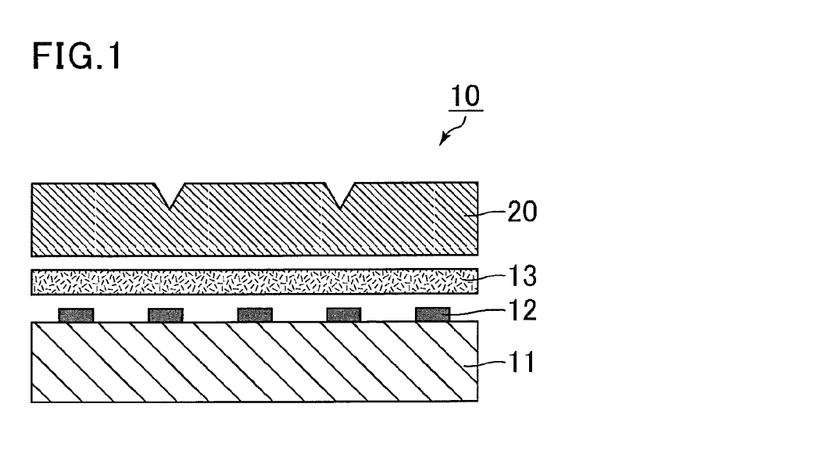
FIG. 1 is a cross-sectional view schematically illustrating a preferred example of the decorative board of the present invention.

FIG. 1 is a cross-sectional view schematically illustrating a preferred example of the decorative board of the present invention.

As illustrated in FIG. 1, a decorative board 10 of the present invention includes a substrate 11, a picture layer 12, and a transparent resin film 20 in the stated order in the thickness direction. The transparent resin film 20 has a pattern of protrusions and depressions on a side opposite to the picture layer 12 side.

An adhesive layer 13 is preferably provided between the picture layer 12 and the transparent resin film 20 as illustrated in FIG. 1.

Hereinbelow, the components of the decorative board of the present invention are described.

The numerical range indicated by "-" herein means "the lower limit or larger and the upper limit or smaller" (e.g., the range "α-β" refers to the range "a or larger and β or smaller").

[Substrate]

The decorative board of the present invention includes a substrate, a picture layer, and a transparent resin film in the stated order in the thickness direction.

The substrate is not limited and is appropriately determined according to the application of the decorative board of the present invention.

The substrate may be made of any known material such as a resin material, a wood material, or a metal material. In particular, the material of the substrate is preferably a resin material or a wood material for its rigidity and lightness. The material may also be a composite material of these.

The resin material preferably contains, for example, a thermoplastic resin.

Preferred examples of the thermoplastic resin include: polyvinyl resins such as polyvinyl chloride resins, polyvinyl acetate resins, and polyvinyl alcohol resins; polyolefin resins such as polyethylene, polypropylene, polystyrene, ethylene-vinyl acetate copolymer resins (EVA), and ethylene-(meth) acrylic acid resins; polyester resins such as polyethylene terephthalate resins (PET resins); homopolymers and copolymers of thermoplastic resins such as acrylic resins, polycarbonate resins, polyurethane resins, acrylonitrile-butadiene-styrene copolymer resins (ABS resins), and acrylonitrile-styrene copolymer resins; and resin mixtures of these. In particular, preferred are polyolefin resins, acrylonitrile-butadiene-styrene copolymer resins, polyvinyl chloride resins, and ionomers. The resin material may be foamed.

Examples of the wood material include various materials such as cedar, cypress, zelkova, pine, lauan, teak, and Melapi. The core may be any of sliced veneers, single panels, plywood panels (including LVL), particle boards, medium-density fiberboards (MDF), high-density fiberboards (HDF), and bonded wood made from the above materials and laminated materials prepared by appropriately laminating these.

Examples of the metal material include iron.

The substrate may contain an inorganic compound. The substrate containing an inorganic compound can have a lower linear expansion coefficient, resulting in higher water resistance of a transparent resin film described later.

In the case where the substrate is formed of multiple resin substrates, the types of the resins forming the multiple resin substrates may be the same or different, and the thicknesses of the multiple resin substrates may be the same or different.

In the present invention, the substrate may have a hollow structure or partially have a slit or a through hole.

The substrate may have any thickness. The thickness is preferably, for example, 0.01 mm or larger, more preferably 0.1 mm or larger and 50 mm or smaller.

The substrate may have a substantially plate shape other than the flat plate shape, such as those including a pattern of protrusions and depressions or a curved surface.

[Picture Layer]

The decorative board of the present invention includes a picture layer on one side of the substrate.

The picture layer is a layer for imparting decorativeness to the decorative board of the present invention. The picture layer may be, for example, a uniformly colored hiding layer (solid print layer), a design layer formed by printing various patterns using ink and a printer, or a layer combining a hiding layer and a design layer (hereafter, referred to as a pattern layer).

The hiding layer can add an intended color to the substrate which may be stained or colored unevenly, thereby adjusting the color of the surface.

The design layer can provide the decorative board with various patterns such as wood-grain patterns, stone grain patterns imitating the surface of a rock such as marble patterns (e.g., pattern of travertine marble), fabric patterns imitating fabric texture or fabric-like patterns, tiled patterns, brick-masonry patterns, and parquet or patchwork patterns which are combinations of the above patterns. These patterns are formed by typical polychromic printing in process colors including yellow, red, blue, and black, or polychromic printing in spot colors in which plates of individual colors constituting the pattern are used.

The ink composition used for the picture layer is a composition prepared by appropriately mixing a binder resin with a colorant such as a pigment and a dye, an extender pigment, a solvent, a stabilizer, a plasticizer, a catalyst, a curing agent, and the like. Any binder resin may be used. Preferred examples thereof include urethane resins, acrylic resins, urethane-acrylic resins, urethane-acrylic copolymer resins, vinyl chloride/vinyl acetate copolymer resins, vinyl chloride/vinyl acetate/acrylic copolymer resins, polyester resins, and nitrocellulose resins. Any of these binder resins may be used alone or in combination of two or more.

Preferred examples of the colorant include: inorganic pigments such as carbon black (Chinese ink), iron black, titanium white, antimony white, chrome yellow, titanium yellow, red iron oxide, cadmium red, ultramarine, and cobalt blue; organic pigments or dyes such as quinacridone red, iso-indolinone yellow, and phthalocyanine blue; metal pigments formed of foil flakes of aluminum, brass, and the like; and pearl-like luster pigments (pearl pigments) formed of foil flakes of titanium dioxide-coated mica, basic lead carbonate, and the like.

The picture layer may have any thickness. The thickness is preferably 0.1 µm or larger, more preferably 0.5 µm or larger and 600 µm or smaller. Having a thickness within the range indicated above, the picture layer can impart an excellent design to the decorative board of the present invention and also can have hiding properties.

In the case where the substrate itself has design properties, such as the case of using sliced veneers, a picture layer may not be provided.

[Layer Containing Ultraviolet Absorber]

The decorative board of the present invention includes at least one layer containing an ultraviolet absorber between the picture layer and a thermoplastic resin layer of a transparent resin film described later.

The layer containing an ultraviolet absorber may be an adhesion primer layer in a transparent resin film described later or an adhesive layer described later. Alternatively, these layers may be both the layers containing an ultraviolet absorber.

[Transparent Resin Film]

The decorative board of the present invention includes a transparent resin film on the side opposite to the substrate side of the picture layer.

The transparent resin film at least includes a thermoplastic resin layer and has a pattern of protrusions and depressions on the side opposite to the picture layer side.

[Thermoplastic Resin Layer]

The thermoplastic resin layer is a layer for protecting the picture layer on one side of the substrate. The thermoplastic resin layer may be translucent or colored as long as the layer is clear enough to visually recognize the picture layer.

Examples of the thermoplastic resin include: olefin resins such as polyethylene, polypropylene, polybutene, polymethylpentene, and olefin-based thermoplastic elastomers; polyester resins such as polyethylene terephthalate, polybutylene terephthalate, polyethylene naphthalate, ethylene glycol-terephthalic acid-isophthalic acid copolymer resins, terephthalic acid-ethylene glycol-1,4-cyclohexane dimethanol copolymer resins, and polyester-based thermoplastic elastomers; acrylic resins such as polymethyl(meth)acrylate, methyl(meth)acrylate-butyl(meth)acrylate copolymer resins, and methyl(meth)acrylate-styrene copolymer resins; polycarbonate resins; polyvinyl chloride; polystyrene; and ionomers. In particular, polypropylene is favorably used as it has high tensile strength and is excellent in chemical resistance to be advantageous in the production process.

The term "(meth)acrylate" as used herein refers to acrylate or methacrylate.

The thermoplastic resin layer may be unstretched or uniaxially or biaxially stretched, if needed.

The thermoplastic resin layer may have any thickness. The lower limit of the thickness is preferably 20 µm and the upper limit thereof is preferably smaller than 500 µm. The lower limit is more preferably 60 jam and the upper limit is more preferably 420 µm. When the thermoplastic resin layer has a thickness of smaller than 20 µm, the thermoplastic resin layer has insufficient tensile strength, failing to protect the surface of the picture layer. When the thermoplastic resin layer has a thickness of 500 µm or larger, the transparent resin film may have a lower transmittance, resulting in lower visibility of the picture of the picture layer.

The thermoplastic resin layer may have a single-layer structure or a laminated structure including two or more layers.

In the case where the thermoplastic resin layer includes multiple layers, the types of the resins forming the multiple layers may be the same or different, and the thicknesses of the multiple resin layers may be the same or different.

Two or more thermoplastic resin layers may be laminated by any common method. Examples of the method include dry lamination and extrusion thermal lamination.

The thermoplastic resin layer may be subjected to surface treatment such as saponification treatment, glow discharge treatment, corona discharge treatment, plasma discharge treatment, ultraviolet (UV) treatment, or flame treatment, within a range of the gist of the present invention.

[Adhesion Primer Layer]

The transparent resin film preferably has an adhesion primer layer on the picture layer side of the thermoplastic resin layer.

The adhesion primer layer can increase the adhesion strength between the transparent resin film and the picture layer.

The adhesion primer layer preferably contains a binder resin.

Examples of the binder resin include urethane resins, acrylic resins, acrylic-urethane resins, acrylic-urethane copolymer resins, cellulosic resins, polyester resins, and vinyl chloride-vinyl acetate copolymer resins. In the case where an ionizing radiation-curable resin composition for a surface protective layer described later contains a urethane acrylate oligomer, the binder resin preferably contains a urethane resin from the standpoint of the adhesion between the transparent resin film and the picture layer and the production efficiency.

The adhesion primer layer preferably has a thickness of 0.5 μm or larger and 10 μm or smaller. Having a thickness of 0.5 μm or larger, the adhesion primer layer can favorably ensure the adhesion to the picture layer. When the adhesion primer layer has a thickness of 10 μm or smaller, the resulting transparent resin film is not too thick and can have sufficient transparency. Thus, the design properties of the decorative board can be favorably ensured. Also, blocking upon film formation can be reduced. The term "blocking" refers to a phenomenon that film surfaces stick to each other when the film is wound off from a film roll obtained upon formation of the transparent resin film or application of an adhesion primer.

The adhesion primer layer may further contain inorganic fine particles such as silica particles.

The adhesion primer layer is preferably the layer containing an ultraviolet absorber.

The adhesion primer layer containing an ultraviolet absorber can favorably impart the weather resistance to the decorative board of the present invention.

The ultraviolet absorber may be, for example, an organic or inorganic ultraviolet absorber. In particular, preferred is an organic ultraviolet absorber for its excellent transparency.

Examples of the organic ultraviolet absorber include: benzotriazole ultraviolet absorbers such as 2'-hydroxyphenyl-5-chlorobenzotriazole ultraviolet absorbers (e.g., 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3'-tert-amyl-5'-methylphenyl)-5-chlorobenzotriazole, 2-(2'-hydroxy-3'-isobutyl-5'-methylphenyl)-5-chlorobenzotriazole, 2-(2'-hydroxy-3'-isobutyl-5'-propylphenyl)-5-chlorobenzotriazole) and 2'-hydroxyphenyl benzotriazole ultraviolet absorbers (e.g., 2-(2'-hydroxy-3',5'-di-tert-butylphenyl)benzotriazole, 2-(2'-hydroxy-5'-methylphenyl)benzotriazole); benzophenone ultraviolet absorbers such as 2,2'-dihydroxybenzophenone ultraviolet absorbers (e.g., 2,2'-dihydroxy-4-methoxybenzophenone, 2,2'-dihydroxy-4,4'-dimethoxybenzophenone, 2,2'-dihydroxy-4,4'-tetrahydroxybenzophenone) and 2-hydroxybenzophenone ultraviolet absorbers (e.g., 2-hydroxy-4-methoxybenzophenone, 2,4-dihydroxybenzophenone); and salicylic acid ester ultraviolet absorbers such as phenyl salicylate and 4-t-butyl-phenyl-salicylate.

In particular, preferred are triazine ultraviolet absorbers from the standpoint of favorably imparting the weather resistance, design properties, and bleed resistance.

Examples of the triazine ultraviolet absorbers include 2,4-bis(2,4-dimethylphenyl)-6-(2-hydroxy-4-n-octyloxyphenyl)-1,3,5-triazine, 2-(2,4-dihydroxyphenyl)-4,6-bis(2,4-dimethylphenyl)-1,3,5-triazine, 2-(2,4-dihydroxyphenyl)-4,6-diphenyl-1,3,5-triazine, 4,4',4''-(1,3,5-triazine-2,4,6-triyltriimino)trisbenzoic acid tris(2-ethylhexyl)ester, 2-(2-hydroxy-4-methoxyphenyl)-4,6-diphenyl-1,3,5-triazine, N,N',N''-tri(m-tolyl)-1,3,5-triazine-2,4,6-triamine, 2,4,6-tris(4-butoxy-2-hydroxyphenyl)-1,3,5-triazine, and 2-(4,6-diphenyl-1,3,5-triazine-2-yl)-5-[2-(2-ethylhexanoyloxy)ethoxy]phenol.

Also usable is a reactive ultraviolet absorber in which an acryloyl or methacryloyl group is introduced into a benzotriazole skeleton. In the case where the required transparency is not high, an inorganic ultraviolet absorber may be added. Examples of the inorganic ultraviolet absorber include titanium oxide, cerium oxide, and iron oxide having a particle size of 0.2 μm or smaller.

The amount of the ultraviolet absorber is appropriately determined according to the UV absorption capacity of the ultraviolet absorber used.

In the case where a triazine ultraviolet absorber is used as the ultraviolet absorber, the amount thereof in the adhesion primer layer is preferably 1% by mass or more and 10% by mass or less.

When the amount in the adhesion primer layer is less than 1% by mass, the weather resistance imparted may be insufficient. When the amount in the adhesion primer layer is more than 10% by mass, the transparency of the film is lowered to lower the design properties of the decorative board or the adhesion to the picture layer or the like may be insufficient to lower the processability of the transparent resin film.

The amount of the ultraviolet absorber is more preferably 2% by mass or more and 7% by mass or less.

[Surface Protective Layer]

The transparent resin film preferably includes a surface protective layer on the side opposite to the picture layer side of the thermoplastic resin layer.

Having a surface protective layer, the transparent resin film has higher durability (e.g., scratch resistance, contamination resistance, weather resistance) to be able to more favorably protect the surface of the picture layer, favorably preventing impairment of the design properties due to damage on the transparent resin film itself.

The surface protective layer may have a single-layer structure or a multilayer structure including multiple layers formed of the same or different material(s). The following materials may be appropriately mixed to form the surface protective layer.

Any surface protective layer may be used. Examples thereof include those formed of a crosslink-cured product of a two-component curable resin or ionizing radiation-curable resin composition. The crosslink-cured product is preferably clear, and may be translucent or colored as long as the layer is clear enough to visually recognize the picture layer described above.

The two-component curable resin may be, for example, a binder resin of the adhesion primer layer.

The ionizing radiation-curable resin is preferably, for example, an oligomer (including what we call a prepolymer and a macromonomer) having a radical polymerizable unsaturated bond or a cationic polymerizable functional group in the molecule and/or a monomer having a radical polymerizable unsaturated bond or a cationic polymerizable functional group in the molecule. The term "ionizing radiation" herein refers to an electromagnetic wave or charged particle having energy capable of polymerizing or crosslinking molecules. The ionizing radiation is typically an electron beam (EB) or ultraviolet light (UV).

Examples of the oligomer or monomer include compounds having a radical polymerizable unsaturated group (e.g., a (meth)acryloyl group, a (meth)acryloyloxy group) or a cationic polymerizable functional group (e.g., an epoxy group) in the molecule. Each of these oligomers or monomers may be used alone, or two or more thereof may be used in admixture. The term "(meth)acryloyl group" as used herein refers to an acryloyl group or a methacryloyo group.

The oligomer having a radical polymerizable unsaturated group in the molecule is preferably, for example, an oligomer of urethane (meth)acrylate, polyester (meth)acrylate, epoxy (meth)acrylate, melamine (meth)acrylate, or triazine (meth)acrylate, more preferably a urethane (meth)acrylate oligomer. An oligomer having a molecular weight of about 250 to 100000 is typically used.

The monomer having a radical polymerizable unsaturated group in the molecule is preferably, for example, a polyfunctional monomer, more preferably a polyfunctional (meth)acrylate.

Examples of the polyfunctional (meth)acrylate include diethylene glycol di(meth)acrylate, propylene glycol di(meth)acrylate, bisphenol A ethylene oxide-modified di(meth)acrylate, trimethyrolpropane tri(meth)acrylate, trimethylolpropane ethylene oxide tri(meth)acrylate, dipentaerythritol tetra(meth)acrylate, dipentaerythritol penta(meth)acrylate (pentafunctional (meth)acrylate), dipentaerythritol hexa(meth)acrylate (hexafunctional (meth)acrylate). The term "polyfunctional monomer" herein refers to a monomer having multiple radical polymerizable unsaturated groups.

In the present invention, the ionizing radiation-curable resin composition preferably further contains an ionizing radiation-curable resin component containing a urethane acrylate oligomer and a polyfunctional monomer. The ionizing radiation-curable resin component particularly preferably contains a urethane acrylate oligomer and a polyfunctional monomer at a mass ratio (urethane acrylate oligomer/polyfunctional monomer) of 6/4-9/1. Within such a mass ratio range, better scratch resistance can be achieved.

If needed, a monofunctional monomer may be appropriately used in addition to the ionizing radiation-curable resin component within a range of the gist of the present invention.

Examples of the monofunctional monomer include methyl(meth)acrylate, 2-ethylhexyl(meth)acrylate, phenoxyethyl (meth)acrylate.

In the case where ultraviolet light is used for crosslinking of the ionizing radiation-curable resin composition, a photopolymerization initiator is preferably added to the ionizing radiation-curable resin composition.

In the case where the ionizing radiation-curable resin composition is a resin system containing a radical polymerizable unsaturated group, the photopolymerization initiator used may be an acetophenone, a benzophenone, a thioxanthone, benzoin, a benzoin methyl ether, or a mixture of these.

In the case where the ionizing radiation-curable resin composition is a resin system containing a cationic polymerizable unsaturated group, the photopolymerization initiator used may be an aromatic diazonium salt, an aromatic sulfonium salt, an aromatic iodonium salt, a metallocene compound, a benzoin sulfonic acid ester, or a mixture of these. The amount of the photopolymerization initiator is about 0.1 to 10 parts by mass per 100 parts by mass of the ionizing radiation-curable resin component.

The ionizing radiation-curable resin composition may further contain additives, if needed. Examples of the additives include thermoplastic resins (e.g., urethane resins, polyvinyl acetal resins, polyester resins, polyolefin resins, styrene resins, polyamide resins, polycarbonate resins, acetal resins, vinyl chloride-vinyl acetate copolymer resins, vinyl acetate resins, acrylic resins, cellulose resins), lubricants (e.g., silicone resins, wax, fluororesins), ultraviolet absorbers (e.g., benzotriazole, benzophenone, triazine), light stabilizers (e.g., hindered amine radical scavengers), and colorants (e.g., dyes, pigments).

The electron beam source for the ionizing radiation used may be, for example, an electron beam accelerator of any type (Cockcroft-Walton type, Van de Graaff type, resonant transformer type, insulating core transformer type, linear type, Dynamitron type, radio frequency type) capable of delivering electrons having an energy of 70-1000 keV. The electron beam dose is preferably, for example, about 1-10 Mrad.

The UV source for the ionizing radiation may be, for example, a light source such as an ultra-high pressure mercury lamp, a high-pressure mercury lamp, a low-pressure mercury lamp, a carbon-arc lamp, a black light, or a metal halide lamp. The ultraviolet light used typically has a wavelength within a range of 190-380 nm.

The surface protective layer may have any thickness. The lower limit of the thickness is preferably 0.1 µm and the upper limit thereof is preferably 50 µm. The lower limit is more preferably 1 µm and the upper limit is more preferably 30 µm. When the surface protective layer has a thickness of smaller than 0.1 µm, sufficient durability (e.g., scratch resistance, contamination resistance, weather resistance) may not be imparted. When the surface protective layer has a thickness of larger than 50 µm, the transparent resin film of the present invention may have a lower transmittance, resulting in lower visibility of the picture of the picture layer.

A primer layer for a surface protective layer is preferably provided between the surface protective layer and the thermoplastic resin layer.

The primer layer for a surface protective layer can increase the adhesion strength between the surface protective layer and the thermoplastic resin layer.

The primer layer for a surface protective layer preferably contains the ultraviolet absorber. The primer layer for a surface protective layer containing the ultraviolet absorber can more favorably impart the weather resistance to the decorative board of the present invention.

The primer layer for a surface protective layer used is preferably a layer similar to the adhesion primer layer described above.

[Surface Roughness]

The transparent resin film has a pattern of protrusions and depressions on the side opposite to the picture layer side.

The pattern of protrusions and depressions on the side opposite to the picture layer side may have any depth. The depth is preferably adjusted as appropriate, for example, in a manner that the center line average roughness Ra defined in JIS B 0601 (1982) is within a range of 1 µm or larger and 30 µm or smaller.

The transparent resin film may have a pattern of protrusions and depressions on the picture layer side.

In the case where the transparent resin film has a protrusion on which a recessed picture layer is laminated on the picture layer side, the pattern of protrusions and depressions preferably has an Rzmax defined in JIS B 0601 (2001) of 80 µm or smaller.

When the pattern of protrusions and depressions on the picture layer side has an Rzmax defined in JIS B 0601 (2001) of larger than 80 µm, bubbles are likely to enter between the picture layer and the transparent resin film, lowering the design properties of the decorative board of the present invention.

The pattern of protrusions and depressions on the picture layer side more preferably has an Rzmax defined in JIS B 0601 (2001) of 60 µm or smaller.

The Rzmax as used herein can be determined by the measurement using a surface profilometer ("SURFCOM-FLEX-50A" available from Tokyo Seimitsu Co., Ltd.) under the following conditions.

(Measurement Condition)
Number of measurements: n=5 (at any five points)
Standard for calculation: JIS'01
Measurement type: roughness measurement Evaluation length: 12.5 mm
Cut-off value: 2.5 mm
Measurement speed: 0.60 mm/s
Filter type: Gaussian filter
Form elimination: straight line
λs value: 8.0 μm In the case of a directional pattern of protrusions and depressions, the measurement is performed in the flow direction and in a direction perpendicular to the flow direction, and the larger measurement value is taken as the Rzmax.

The pattern of protrusions and depressions may be formed by any method. Examples of the method include thermal embossing and transferring of a pattern of protrusions and depressions using a shape-forming sheet.

Thermal embossing may be performed, for example, using a known sheet- or rotary embosser.

Examples of an embossed pattern include a grain pattern, a hairline pattern, a satin pattern, a wood-grain vessel pattern, a pattern of protrusions and depressions of slab surfaces, a fabric surface texture, and a linear streak pattern.

The embossing may be performed at any temperature, preferably at a temperature that reduces a loss of the pattern of protrusions and depressions, i.e., an embossing return, during molding by thermal press bonding.

In the case of having a pattern of protrusions and depressions on the picture layer side, the transparent resin film may have both surfaces subjected to formation of a pattern of protrusions and depressions by the above method. Alternatively, a pattern of protrusions and depressions may be formed on one surface of the transparent resin film by the above method in a manner that a pattern of protrusions and depressions corresponding to the pattern of protrusions and depressions on the one surface is formed on the other surface.

The transparent resin film may have any thickness. Still, the transparent resin film preferably has a thickness at a depression of the pattern of protrusions and depressions of 80 μm or larger. When the transparent resin film has a thickness at a depression of the pattern of protrusions and depressions of smaller than 80 μm, sufficient durability (e.g., abrasion resistance, scratch resistance) may not be imparted to the decorative board of the present invention.

Here, the term "a depression of the pattern of protrusions and depressions" is described.

Figure 2:
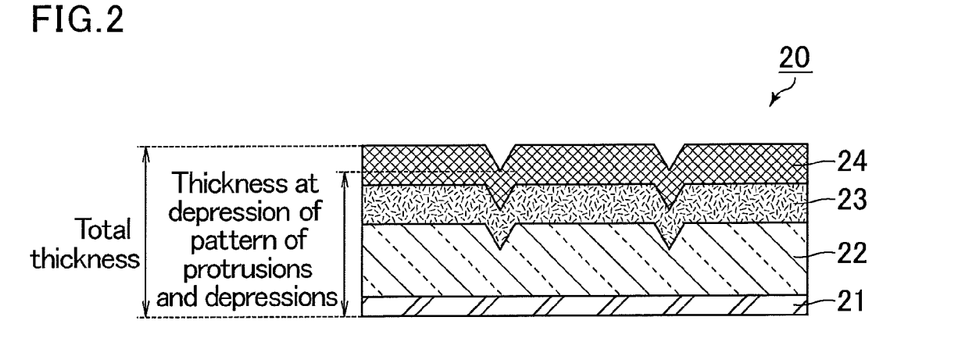
FIG. 2 is a cross-sectional view schematically illustrating a preferred example of the transparent resin film included in the decorative board of the present invention.
Figure 3:
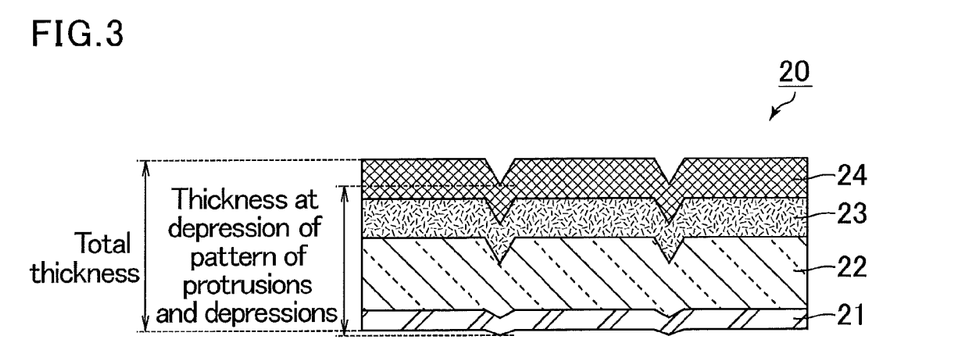
FIG. 3 is a cross-sectional view schematically illustrating a preferred example of the transparent resin film included in the decorative board of the present invention.

FIGS. 2 and 3 each show a cross-sectional view schematically illustrating a preferred example of the transparent resin film included in the decorative board of the present invention.

A transparent resin film 20 shown in FIGS. 2 and 3 includes an adhesion primer layer 21, a thermoplastic resin layer 22, a primer layer 23 for a surface protective layer, and a surface protective layer 24 in the stated order in the thickness direction.

The term "a depression of the pattern of protrusions and depressions" refers to the thinnest part of the transparent resin film and a part including the deepest depression of the pattern of protrusions and depressions on the surface protective layer 24. It can be confirmed by microscopic observation of a cross section of the transparent resin film 20.

In FIG. 2, the total thickness of the transparent resin film 20 is the length from the surface on the surface protective layer 24 side to the surface on the opposite side and the "thickness at a depression of the pattern of protrusions and depressions" is the length from the bottom of the deepest depression on the surface protective layer 24 side to the surface of the adhesion primer layer 21.

In the case where the formation of a pattern of protrusions and depressions on the surface on the surface protective layer 24 side causes formation of a pattern of protrusions and depressions on the surface on the opposite side, in correspondence with the deepest depression of the pattern of protrusions and depressions on the surface protective layer 24 side of the transparent resin film 20, a protrusion is formed on the opposite side surface as illustrated in FIG. 3. In this case, the "thickness at a depression of the pattern of protrusions and depressions" is the length from the bottom of the deepest depression of the pattern of protrusions and depressions on the surface protective layer 24 side of the transparent resin film 20 to the surface on the opposite side on which such a protrusion is present.

The lower limit of the total thickness of the transparent resin film is preferably 100 μm and the upper limit thereof is preferably 500 μm. The lower limit is more preferably 140 μm and the upper limit is more preferably 460 μm.

The upper limit of the thickness at a depression of the pattern of protrusions and depressions of the transparent resin film is not limited, and is preferably, for example, 500 μm.

The transparent resin film is preferably used for protecting a picture layer provided on one side of a substrate.

The present invention also encompasses the transparent resin film used for protecting a picture layer provided on one side of a substrate.

[Adhesive Layer]

The decorative board of the present invention preferably includes an adhesive layer between the picture layer and a transparent resin film described above.

The adhesive layer can further increase the adhesion strength between the picture layer and the transparent resin film described above.

The adhesive layer preferably contains a binder resin.

Examples of the binder resin include urethane resins, acrylic resins, acrylic-urethane resins, acrylic-urethane copolymer resins, cellulosic resins, polyester resins, and vinyl chloride-vinyl acetate copolymer resins. In the case where the ionizing radiation-curable resin composition for a surface protective layer described above contains a urethane acrylate oligomer, the binder resin is preferably a urethane resin from the standpoint of the adhesion between the picture layer and the transparent resin film described above and the production efficiency.

The adhesive layer may have any thickness. Preferably, the thickness of the adhesive layer is 10 μm or larger and, in the case where the transparent resin film has a pattern of protrusions and depressions on the picture layer side, larger than the Rzmax defined in JIS B 0601 (2001) of the pattern of protrusions and depressions.

When the thickness of the adhesive layer is 10 μm or larger and larger than the Rzmax defined in JIS B 0601 (2001) of the pattern of protrusions and depressions on the picture layer side of the transparent resin film described later, the adhesion between the picture layer and the transparent resin film described later can be favorably ensured.

When the thickness of the adhesive layer is smaller than 10 μm, the adhesive layer may fail to give sufficient adhesion between the picture layer and the transparent resin film described later. When the thickness is smaller than the Rzmax defined in JIS B 0601(2001) of the pattern of protrusions and depressions on the picture layer side of the transparent resin film described later, air bubbles may enter between the picture layer and the transparent resin film described above to lower the design properties.

The adhesive layer may contain inorganic fine particles such as silica particles.

The adhesive layer may be bonded by any method such as heat melting, thermal lamination, or lamination using a water-based adhesive, a thermosensitive adhesive, a pressure-sensitive adhesive, or a hot-melt adhesive.

The adhesive layer is preferably the layer containing an ultraviolet absorber.

The adhesive layer containing an ultraviolet absorber can favorably impart excellent weather resistance to the decorative board of the present invention.

The ultraviolet absorber may be, for example, an organic or inorganic ultraviolet absorber. In particular, preferred is an organic ultraviolet absorber for its excellent transparency.

Examples of the organic ultraviolet absorber include: benzotriazole ultraviolet absorbers such as 2'-hydroxyphenyl-5-chlorobenzotriazole ultraviolet absorbers (e.g., 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3'-tert-amyl-5'-methylphenyl)-5-chlorobenzotriazole, 2-(2'-hydroxy-3'-isobutyl-5'-methylphenyl)-5-chlorobenzotriazole, 2-(2'-hydroxy-3'-isobutyl-5'-propylphenyl)-5-chlorobenzotriazole) and 2'-hydroxyphenyl benzotriazole ultraviolet absorbers (e.g., 2-(2'-hydroxy-3',5'-di-tert-butylphenyl)benzotriazole, 2-(2'-hydroxy-5'-methylphenyl)benzotriazole); benzophenone ultraviolet absorbers such as 2,2'-dihydroxybenzophenone ultraviolet absorbers (e.g., 2,2'-dihydroxy-4-methoxybenzophenone, 2,2'-dihydroxy-4,4'-dimethoxybenzophenone, 2,2'-dihydroxy-4,4'-tetrahydroxybenzophenone) and 2-hydroxybenzophenone ultraviolet absorbers (e.g., 2-hydroxy-4-methoxybenzophenone, 2,4-dihydroxybenzophenone); and salicylic acid ester ultraviolet absorbers such as phenyl salicylate and 4-t-butyl-phenyl-salicylate.

In particular, preferred are triazine ultraviolet absorbers from the standpoint of favorably imparting the weather resistance, design properties, and bleed resistance.

The triazine ultraviolet absorber may be appropriately selected from the triazine ultraviolet absorbers mentioned for the adhesion primer layer described above.

Also usable is a reactive ultraviolet absorber in which an acryloyl or methacryloyl group is introduced into a benzotriazole skeleton. In the case where the required transparency is not high, an inorganic ultraviolet absorber may be added. Examples of the inorganic ultraviolet absorber include titanium oxide, cerium oxide, and iron oxide having a particle size of 0.2 μm or smaller.

The amount of the ultraviolet absorber is appropriately determined according to the UV absorption capacity of the ultraviolet absorber used.

In the case where a triazine ultraviolet absorber is used as the ultraviolet absorber, the amount thereof in the adhesive layer is preferably 0.5% by mass or more and 2% by mass or less.

When the amount in the adhesive layer is less than 0.5% by mass, the weather resistance imparted may be insufficient. When the amount in the adhesive layer is more than 2% by mass, the transparency of the adhesive layer is lowered to lower the design properties of the decorative board or the adhesion between the picture layer and the transparent resin film described above may be insufficient to lower the processability of the decorative board of the present invention.

The amount of the ultraviolet absorber is more preferably 1% by mass or more and 1.5% by mass or less.

[Method for Producing Decorative Board]

The decorative board of the present invention may be produced, for example, by heat melting, thermal lamination, or lamination of the substrate, the picture layer, and the transparent resin film using a water-based adhesive, a thermosensitive adhesive, a pressure-sensitive adhesive, a hot-melt adhesive, or an adhesive used for forming the adhesive layer described above.

In particular, the method preferably includes: forming the adhesive layer on the picture layer side of the transparent resin film; and bonding the transparent resin film and the picture layer with the adhesive layer.

The present invention also encompasses such a method for producing the decorative board of the present invention.

The method for producing a decorative board of the present invention can prevent air entrainment, i.e., a phenomenon that air enters into the pattern of protrusions and depressions on the picture layer side of the transparent resin film, thereby suppressing impairment of the design properties of the picture layer.

The decorative board of the present invention may have any thickness. The thickness is preferably, for example, 0.05 mm or larger, more preferably 1 mm or larger and 50 mm or smaller.

EXAMPLES

The present invention is more specifically described with reference to, but not limited to, examples hereinbelow.

Example 1

To one surface of a transparent polypropylene film (thickness of 60 μm) was applied a two-component curable urethane resin containing isocyanate as a curing agent. Thus, an adhesion primer layer having a thickness of 2 μm was obtained. To the other surface of the transparent polypropylene film (surface on the side opposite to the adhesion primer layer side) was melt-extruded and thermal laminated a transparent polypropylene resin (thickness of 80 μm).

The surface (on the side opposite to the adhesion primer layer side) of the transparent polypropylene resin (thickness of 80 μm) was subjected to corona treatment. Then, to the surface was applied a two-component curable urethane resin containing isocyanate as a curing agent. Thus, a primer layer for a surface protective layer having a thickness of 2 μm was formed.

To the surface on which the primer layer for a surface protective layer had been formed was applied by gravure coating a urethane acrylate oligomer that is an ionizing radiation-curable resin for forming a surface protective layer. The applied resin was irradiated with an electron beam at an accelerating voltage of 165 keV and 5 Mrad, thereby forming a surface protective layer having a thickness of 15 μm.

After heating of the surface protective layer side with a contactless infrared heater, the obtained film was directly subjected to thermal pressure embossing, thereby forming a pattern of protrusions and depressions. Thus, a transparent resin film was provided. The obtained transparent resin film had a thickness of 159 μm, a thickness at a depression of the pattern of protrusions and depressions of 100 μm, and an Rzmax of 40 μm.

Separately, a high-density fiberboard (HDF) (thickness of 3 mm) was provided. On one surface of the HDF was formed a picture layer having a thickness of 2 μm using an inkjet printer. Thus, a substrate was provided.

To the surface on the adhesion primer layer side of the obtained transparent resin film was applied a two-component curable polyester resin containing isocyanate as a curing agent to form an adhesive layer having a thickness of 50 μm. The obtained transparent resin film and the substrate were laminated in a manner that the adhesion primer layer of the transparent resin film faces the picture layer. Here, to the two-component curable polyester resin was added a triazine ultraviolet absorber (product name: ADK STAB LA-46, available from ADEKA Corporation) in a manner that the triazine ultraviolet absorber content was 1% by mass.

Then, the laminate was allowed to stand in a room-temperature environment under a pressure of 10 kg/m$^2$ for three days. Thus, a decorative board was obtained. The thickness of the obtained transparent resin film and the thickness at a depression of the pattern of protrusions and depressions were as shown in Table 1.

Example 2

A decorative board was produced as in Example 1, except that the triazine ultraviolet absorber (product name: ADK STAB LA-46, available from ADEKA Corporation) was added to the two-component curable polyester resin in a manner that the triazine ultraviolet absorber content was 0.5% by mass. The thickness of the obtained transparent resin film and the thickness at a depression of the pattern of protrusions and depressions were as shown in Table 1.

Example 3

A decorative board was produced as in Example 1, except that the triazine ultraviolet absorber (product name: ADK STAB LA-46, available from ADEKA Corporation) was added to the two-component curable polyester resin in a manner that the triazine ultraviolet absorber content was 2% by mass. The thickness of the obtained transparent resin film and the thickness at a depression of the pattern of protrusions and depressions were as shown in Table 1.

Example 4

A transparent polypropylene film (thickness of 50 μm) was used instead of the transparent polypropylene film (thickness of 60 μm). To one surface of the transparent polypropylene film (thickness of 50 μm) was applied a two-component curable urethane resin containing isocyanate as a curing agent. Thus, an adhesion primer layer having a thickness of 2 μm was obtained. To the other surface of the transparent polypropylene film (thickness of 50 μm) (surface on the side opposite to the adhesion primer layer side) was melt-extruded and thermal laminated a transparent polypropylene resin (thickness of 50 μm). Then, a primer layer for a surface protective layer and a surface protective layer were formed as in Example 1, and embossing was performed using a shallow embossing plate different from the plate used in Example 1. Thus, a transparent resin film was obtained.

To the surface on the adhesion primer layer side of the obtained transparent resin film was applied a two-component curable polyester resin containing isocyanate as a curing agent to form an adhesive layer having a thickness of 10 μm. The obtained transparent resin film and a substrate produced as in Example 1 were laminated in a manner that the adhesion primer layer of the transparent resin film faces a picture layer.

Except for the above process, a decorative board was produced as in Example 1. The thickness of the obtained transparent resin film and the thickness at a depression of the pattern of protrusions and depressions were as shown in Table 1.

Example 5

A decorative board was produced as in Example 4, except that the triazine ultraviolet absorber (product name: ADK STAB LA-46, available from ADEKA Corporation) was added to the two-component curable polyester resin in a manner that the triazine ultraviolet absorber content was 0.5% by mass. The thickness of the obtained transparent resin film and the thickness at a depression of the pattern of protrusions and depressions were as shown in Table 1.

Example 6

To one surface of a transparent polypropylene film (thickness of 60 μm) was applied a two-component curable urethane resin containing isocyanate as a curing agent. Thus, an adhesion primer layer having a thickness of 2 μm was obtained. To the other surface of the transparent polypropylene film (surface on the side opposite to the adhesion primer layer side) was melt-extruded and thermal laminated a transparent polypropylene resin (thickness of 60 μm).

Then, a primer layer for a surface protective layer and a surface protective layer were formed as in Example 1, and embossing was performed using a shallow embossing plate different from the plate used in Example 1. Thus, a transparent resin film was obtained.

To the surface on the adhesion primer layer side of the obtained transparent resin film was applied a two-component curable polyester resin containing isocyanate as a curing agent to form an adhesive layer having a thickness of 40 μm. The obtained transparent resin film and a substrate produced as in Example 1 were laminated in a manner that the adhesion primer layer of the transparent resin film faces a picture layer.

Here, to the two-component curable polyester resin was added a triazine ultraviolet absorber (product name: ADK STAB LA-46, available from ADEKA Corporation) in a manner that the triazine ultraviolet absorber content was 0.5% by mass.

Except for the above process, a decorative board was produced as in Example 1. The thickness of the obtained transparent resin film and the thickness at a depression of the pattern of protrusions and depressions were as shown in Table 1.

Example 7

A decorative board was produced as in Example 1, except that the ultraviolet absorber added to the two-component curable polyester resin was changed to a benzotriazole ultraviolet absorber (product name: ADK STAB LA-36, available from ADEKA Corporation). The thickness of the obtained transparent resin film and the thickness at a depression of the pattern of protrusions and depressions were as shown in Table 1.

Comparative Example 1

A decorative board was produced as in Example 4, except that no ultraviolet absorber was added to the two-component curable polyester resin. The thickness of the obtained transparent resin film and the thickness at a depression of the pattern of protrusions and depressions were as shown in Table 1.

Example 8

A transparent resin film and a decorative board were produced as in Example 4, except that a deep embossing plate different from the plate used in Example 4 was used for the embossing. The thickness of the obtained transparent resin film and the thickness at a depression of the pattern of protrusions and depressions were as shown in Table 1.

Example 9

A transparent polypropylene film (thickness of 80 µm) was used instead of the transparent polypropylene film (thickness of 60 µm). To one surface of the transparent polypropylene film (thickness of 80 µm) was applied a two-component curable urethane resin containing isocyanate as a curing agent. Thus, an adhesion primer layer having a thickness of 2 µm was obtained. To the other surface of the transparent polypropylene film (thickness of 80 µm) (surface on the side opposite to the adhesion primer layer side) was melt-extruded and thermal laminated a transparent polypropylene resin (thickness of 80 µm). Then, a primer layer for a surface protective layer and a surface protective layer were formed as in Example 1, and embossing was performed using a deep embossing plate different from the plate used in Example 1. Thus, a transparent resin film was obtained.

To the surface on the adhesion primer layer side of the obtained transparent resin film was applied a two-component curable polyester resin containing isocyanate as a curing agent to form an adhesive layer having a thickness of 100 µm. The obtained transparent resin film and a substrate produced as in Example 1 were laminated in a manner that the adhesion primer layer of the transparent resin film faces a picture layer.

Except for the above process, a decorative board was produced as in Example 2. The thickness of the obtained transparent resin film and the thickness at a depression of the pattern of protrusions and depressions were as shown in Table 1.

Example 10

To the surface on the adhesion primer layer side of a transparent resin film obtained as in Example 4 was applied a two-component curable polyester resin containing isocyanate as a curing agent to form an adhesive layer having a thickness of 5 µm. The obtained transparent resin film and a substrate produced as in Example 1 were laminated in a manner that the adhesion primer layer of the transparent resin film faces a picture layer.

Except for the above process, a decorative board was produced as in Example 4. The thickness of the obtained transparent resin film and the thickness at a depression of the pattern of protrusions and depressions were as shown in Table 1.

Example 11

A decorative board was produced as in Example 1, except that the triazine ultraviolet absorber (product name: ADK STAB LA-46, available from ADEKA Corporation) was added to the two-component curable polyester resin in a manner that the triazine ultraviolet absorber content was 3% by mass. The thickness of the obtained transparent resin film and the thickness at a depression of the pattern of protrusions and depressions were as shown in Table 1.

Example 12

To one surface of a transparent polypropylene film (thickness of 60 µm) was applied a two-component curable urethane resin containing isocyanate as a curing agent and a triazine ultraviolet absorber (product name: ADK STAB LA-46, available from ADEKA Corporation) in an amount of 5% by mass. Thus, an adhesion primer layer having a thickness of 2 µm was obtained. To the other surface of the transparent polypropylene film (surface on the side opposite to the adhesion primer layer side) was melt-extruded and thermal laminated a transparent polypropylene resin (thickness of 80 µm).

The surface (on the side opposite to the adhesion primer side) of the transparent polypropylene resin (thickness of 80 µm) was subjected to corona treatment. Then, to the surface was applied a two-component curable urethane resin containing isocyanate as a curing agent. Thus, a primer layer for a surface protective layer having a thickness of 2 µm was formed.

To the surface on which the primer layer for a surface protective layer had been formed was applied by gravure coating a urethane acrylate oligomer that is an ionizing radiation-curable resin for forming a surface protective layer. The applied resin was irradiated with an electron beam at an accelerating voltage of 165 keV and 5 Mrad, thereby forming a surface protective layer having a thickness of 15 µm.

After heating of the surface protective layer side with a contactless infrared heater, the obtained film was directly subjected to thermal pressure embossing, thereby forming a pattern of protrusions and depressions. Thus, a transparent resin film was provided. The obtained transparent resin film had a thickness of 159 µm and a thickness at a depression of the pattern of protrusions and depressions of 100 µm.

Separately, a high-density fiberboard (HDF) (thickness of 3 mm) was provided. On one surface of the HDF was formed a picture layer having a thickness of 2 µm using an inkjet printer. Thus, a substrate was provided.

To the surface on the adhesion primer layer side of the obtained transparent resin film was applied a two-component curable polyester resin containing isocyanate as a curing agent to form an adhesive layer having a thickness of 30 µm. The obtained transparent resin film and the substrate were laminated in a manner that the adhesion primer layer of the transparent resin film faces the picture layer. Then, the laminate was allowed to stand in a room-temperature environment under a pressure of 10 kg/m² for three days. Thus, a decorative board was obtained. The thickness of the obtained transparent resin film and the thickness at a depression of the pattern of protrusions and depressions were as shown in Table 2.

Examples 13-14

A transparent resin film and a decorative board were produced as in Example 12, except that the amount of the triazine ultraviolet absorber (product name: ADK STAB LA-46, available from ADEKA Corporation) added to the adhesion primer layer was changed to 1% by mass (Example 13) or 10% by mass (Example 14). The thickness of the obtained transparent resin film and the thickness at a depression of the pattern of protrusions and depressions were as shown in Table 2.

Example 15

To one surface of a transparent polypropylene film (thickness of 60 μm) was applied a two-component curable urethane resin containing isocyanate as a curing agent and a triazine ultraviolet absorber (product name: ADK STAB LA-46, available from ADEKA Corporation) in an amount of 1% by mass (thickness of 0.5 μm) to form an adhesion primer layer. A transparent resin film and a decorative board were produced as in Example 12, except that to the other surface of the transparent polypropylene film (60 μm) was extruded and thermal laminated a transparent polypropylene resin (thickness of 60 μm) instead of the transparent polypropylene resin (thickness of 80 μm). The thickness of the obtained transparent resin film and the thickness at a depression of the pattern of protrusions and depressions were as shown in Table 2.

Example 16

A transparent resin film and a decorative board were produced as in Example 12, except that the thickness of the adhesion primer layer was 10 μm. The thickness of the obtained transparent resin film and the thickness at a depression of the pattern of protrusions and depressions were as shown in Table 2.

Example 17

A transparent resin film and a decorative board were produced as in Example 12, except that to the two-component curable polyester resin containing isocyanate as a curing agent (thickness of 50 μm) for an adhesive layer was added a triazine ultraviolet absorber (product name: ADK STAB LA-46, available from ADEKA Corporation) in an amount of 1% by mass. The thickness of the obtained transparent resin film and the thickness at a depression of the pattern of protrusions and depressions were as shown in Table 2.

Example 18

A transparent resin film and a decorative board were produced as in Example 12, except that the ultraviolet absorber added to the adhesion primer layer was changed to a benzotriazole ultraviolet absorber (product name: ADK STAB LA-36, available from ADEKA Corporation). The thickness of the obtained transparent resin film and the thickness at a depression of the pattern of protrusions and depressions were as shown in Table 2.

Comparative Example 2

A transparent resin film and a decorative board were produced as in Example 15, except that no ultraviolet absorber was added to the adhesion primer layer. The thickness of the obtained transparent resin film and the thickness at a depression of the pattern of protrusions and depressions were as shown in Table 2.

Example 19

A transparent resin film and a decorative board were produced as in Example 12, except that the thickness of the adhesion primer layer was 13 μm. The thickness of the obtained transparent resin film and the thickness at a depression of the pattern of protrusions and depressions were as shown in Table 2.

<Measurement of Rzmax>

For the decorative boards obtained in Examples 1-19 and Comparative Examples 1 and 2, measurement of the Rzmax defined in JIS B 0601 (2001) of the pattern of protrusions and depressions on the picture layer side of the transparent resin film was performed with a surface profilometer ("SURFCOM-FLEX-50A" available from Tokyo Seimitsu Co., Ltd.) under the following conditions.

(Measurement Condition)
Number of measurements: n=5 (at any five points)
Standard for calculation: JIS'01
Measurement type: roughness measurement
Evaluation length: 12.5 mm
Cut-off value: 2.5 mm
Measurement speed: 0.60 mm/s
Filter type: Gaussian filter
Form elimination: straight line
λs value: 8.0 μm In the case of a directional pattern of protrusions and depressions, the measurement was performed in the flow direction and in a direction perpendicular to the flow direction, and the larger measurement value was taken as the Rzmax.

(Evaluation Method)
<Abrasion Resistance (Taber Abrasion Test)>

For the decorative boards obtained in Examples 1-19 and Comparative Examples 1 and 2, a test was performed under a load of 1 kg using a Taber abrasion tester (available from Rigaku Kogyo Co., Ltd.) and an abrasion wheel (S-42) in conformity with Abrasion A test of Japanese Agricultural Standards for flooring. Evaluation was performed on the pattern of the picture layer remaining after 1000 rotations. Tables 1 and 2 show the results.

++: 80% or more of the picture layer remained.
+: 50% or more but less than 80% of the picture layer remained.
−: Less than 50% of the picture layer remained.

<Color Difference after Weather Resistance Test>

The decorative boards obtained in Examples 1-19 and Comparative Examples 1 and 2 were put in a super accelerated weathering tester (EYE Super UV Tester available from Iwasaki Electric Co., Ltd.) set at conditions mentioned below, and taken out after 17 cycle operation in which one cycle includes 20-hour irradiation and 4-hour dew condensation.

(Accelerated Test Condition)
Black panel temperature: 63° C.
Humidity: 50% RH
Irradiation intensity: 60 W/m² (365 nm)

The color difference of each decorative board before and after the accelerated test was measured with a color difference meter (CR-300 available from Minolta Co., ltd.). Specifically, the L-value, a-value, and b-value of the decorative board were measured before and after the accelerated test, and the color difference ΔE was calculated using the following equation 1. Tables 1 and 2 show the results.

$$\Delta E=[(\Delta L)^2+(\Delta a)^2+(\Delta b)^2]^{1/2} \quad \text{Equation 1}$$

++: ΔE<1.0
+: 1.0≤ΔE<1.5
−: ΔE≥1.5

$\Delta L = |L\text{-value(after weather resistance test)}-L\text{-value (before weather resistance test)}|$ $\Delta a = |a\text{-value(after weather resistance test)}-a\text{-value (before weather resistance test)}|$ $\Delta b = |a\text{-value(after weather resistance test)}-a\text{-value (before weather resistance test)}|$ <Design Properties>

The printed patterns of the decorative boards obtained in Examples 1-19 and Comparative Examples 1 and 2 were visually evaluated. Tables 1 and 2 show the results.
+++: The printed pattern was clearly visible.
++: The printed pattern was blurred slightly.
+: The printed pattern turned yellow slightly.
−: The printed pattern was not clearly visible.

<Film-Forming Properties>

For evaluation of the film-forming properties, the presence or absence of defects (blocking) in production of the transparent resin films in Examples 12-19 and Comparative Example 2. Table 2 shows the results.
++: No blocking occurred.
+: Blocking occurred little.
−: Blocking occurred.

<Processability (Adhesion Strength)>

For Examples 1-19 and Comparative Examples 1 and 2, the adhesion strength was evaluated upon laminating the obtained transparent resin film and a substrate in a manner that the surface on the side opposite to the side with a pattern of protrusions and depressions of the transparent resin film is in contact with the surface on the picture layer side of the substrate. Tables 1 and 2 show the results.
++: Adhesion was achieved without any problem (adhesion strength of higher than 20 N/25 mm)+
+: Adhesion strength was slightly low (adhesion strength of 15 N/25 mm or higher and 20 N/25 mm or lower)
−: Adhesion strength was very low (adhesion strength of lower than 15 N/25 mm)

For the decorative boards obtained in the examples and comparative examples, the adhesion strength was determined as follows. The transparent resin film was peeled from the substrate on which a picture layer was laminated at a peeling angle of 180° at a tensile speed of 200 ram/min using a Tensilon universal testing machine "RTC-1250A" (available from Orientec Co., Ltd.), and the maximum value of the peeling strength [width of N/25 mm] was taken as the adhesion strength.

TABLE 1

|  | Example 1 | Example 2 | Example 3 | Example 4 | Example 5 | Example 6 | Comparative Example 1 |
|---|---|---|---|---|---|---|---|
| Thickness of transparent resin film (μm) | 159 | 159 | 159 | 119 | 119 | 139 | 119 |
| Thickness at depression of pattern of protrusions and depressions of transparent resin film (μm) | 100 | 100 | 100 | 80 | 80 | 80 | 80 |
| Thickness of adhesive layer (μm) | 50 | 50 | 50 | 10 | 10 | 40 | 10 |
| Amount of ultraviolet absorber added to adhesive layer (mass %) | 1 | 0.5 | 2 | 1 | 0.5 | 0.5 | 0 |
| Rzmax of transparent resin film (μm) | 40 | 40 | 40 | 10 | 10 | 40 | 10 |
| Abrasion resistance | ++ | ++ | ++ | + | + | + | + |
| Color difference after weather resistance test | ++ | ++ | ++ | + | + | ++ | − |
| Design properties | +++ | +++ | ++ | +++ | +++ | +++ | +++ |
| Processability (adhesion strength) | ++ | ++ | ++ | ++ | ++ | ++ | ++ |

|  | Example 7 | Example 8 | Example 9 | Example 10 | Example 11 |
|---|---|---|---|---|---|
| Thickness of transparent resin film (μm) | 159 | 119 | 179 | 119 | 159 |
| Thickness at depression of pattern of protrusions and depressions of transparent resin film (μm) | 100 | 70 | 100 | 80 | 100 |
| Thickness of adhesive layer (μm) | 50 | 10 | 100 | 5 | 50 |
| Amount of ultraviolet absorber added to adhesive layer (mass %) | 1 Benzotriazole-type | 1 | 0.5 | 1 | 3 |
| Rzmax of transparent resin film (μm) | 40 | 10 | 90 | 10 | 40 |
| Abrasion resistance | ++ | − | ++ | + | ++ |
| Color difference after weather resistance test | ++ | + | ++ | + | ++ |
| Design properties | + | +++ | − | − | − |
| Processability (adhesion strength) | + | ++ | ++ | ++ | + |

TABLE 2

|  | Example 12 | Example 13 | Example 14 | Example 15 | Example 16 |
|---|---|---|---|---|---|
| Thickness of transparent resin film (μm) | 159 | 159 | 159 | 137.5 | 167 |
| Thickness at depression of pattern of protrusions and depressions of transparent resin film (μm) | 100 | 100 | 100 | 80 | 100 |
| Thickness of adhesion primer layer (μm) | 2 | 2 | 2 | 0.5 | 10 |
| Amount of ultraviolet absorber added to adhesion primer layer (%) | 5 | 1 | 10 | 1 | 5 |
| Type of ultraviolet absorber | Triazine type | Triazine type | Triazine type | Triazine type | Triazine type |
| Addition of ultraviolet absorber to adhesive layer | Not added | Not added | Not added | Not added | Not added |
| Abrasion resistance | ++ | ++ | ++ | + | ++ |
| Color difference after weather resistance test | ++ | ++ | ++ | + | ++ |

TABLE 2-continued

|  | | | | | |
|---|---|---|---|---|---|
| Design properties | +++ | +++ | ++ | +++ | +++ |
| Film-forming properties (blocking resistance) | ++ | ++ | ++ | ++ | + |
| Processability (adhesion strength) | ++ | ++ | + | + | ++ |

|  | Example 17 | Comparative Example 2 | Example 18 | Example 19 |
|---|---|---|---|---|
| Thickness of transparent resin film (μm) | 159 | 137.5 | 159 | 170 |
| Thickness at depression of pattern of protrusions and depressions of transparent resin film (μm) | 100 | 80 | 100 | 100 |
| Thickness of adhesion primer layer (μm) | 2 | 0.5 | 2 | 13 |
| Amount of ultraviolet absorber added to adhesion primer layer (%) | 5 | 0 | 5 | 1 |
| Type of ultraviolet absorber | Triazine type | — | Benzotriazole type | Triazine type |
| Addition of ultraviolet absorber to adhesive layer | Added | Not added | Not added | Not added |
| Abrasion resistance | ++ | + | ++ | ++ |
| Color difference after weather resistance test | ++ | − | ++ | ++ |
| Design properties | +++ | +++ | + | − |
| Film-forming properties (blocking resistance) | ++ | ++ | ++ | − |
| Processability (adhesion strength) | ++ | + | + | ++ |

Table 1 shows that the decorative boards obtained in Examples 1-11 are excellent in weather resistance.

In particular, Examples 1-6 in which the thickness at a depression of the pattern of protrusions and depressions and Rzmax of the transparent resin film and the thickness of the adhesive layer were each within a predetermined range and a triazine ultraviolet absorber was used were excellent in abrasion resistance, design properties, and processability.

In contrast, Example 7 in which a benzotriazole ultraviolet absorber was used as the ultraviolet absorber suffered yellowing to be slightly inferior in design properties. Example 7 was also inferior in processability. Example 8 in which the thickness at a depression of the pattern of protrusions and depressions of the transparent resin film was smaller than 80 μm was inferior in abrasion resistance. Example 9 in which the Rzmax of the transparent resin film was more than 80 μm and Example 10 in which the thickness of the adhesive layer was smaller than 10 μm suffered air entrainment to be inferior in design properties. Example 11 in which the adhesive layer contained 3% by mass of the ultraviolet absorber had lower transparency to be inferior in design properties.

Comparative Example 1 in which no layer containing an ultraviolet absorber was provided was inferior in weather resistance.

Table 2 shows that the decorative boards obtained in Examples 12-19 were excellent in weather resistance.

In particular, Examples 12-17 in which the thickness at a depression of the pattern of protrusions and depressions of the transparent resin film was within a predetermined range, the thickness of the adhesion primer layer was within a predetermined range, and a triazine ultraviolet absorber was used were excellent in abrasion resistance, design properties, film-forming properties, and processability.

In contrast, Example 18 in which a benzotriazole ultraviolet absorber was used as the ultraviolet absorber suffered yellowing to be slightly inferior in design properties. Example 19 in which the thickness of the adhesion primer layer was larger than 10 μm had lower transparency to be inferior in design properties.

Comparative Example 2 in which no layer containing an ultraviolet absorber was provided was inferior in weather resistance.

INDUSTRIAL APPLICABILITY

The present invention can provide a decorative board excellent in weather resistance. For the excellent weather resistance, the decorative board of the present invention is favorably used for building materials such as fittings, doors (e.g., sliding doors), floor materials, wall materials, and ceiling materials, and various decorative molded articles.

REFERENCE SIGNS LIST

10: decorative board
11: substrate
12: picture layer
13: adhesive layer
20: transparent resin film
21: adhesion primer layer
22: thermoplastic resin layer
23: primer layer for surface protective layer
24: surface protective layer

The invention claimed is:

1. A decorative board comprising:
    a substrate;
    a picture layer; and
    a transparent resin film, in a stated order of the substrate; the picture layer; and the transparent resin film in a thickness direction,
    the transparent resin film comprising at least an adhesion primer layer, a thermoplastic resin layer, a primer layer, and a surface protective layer in the stated order in the thickness direction, and the transparent resin film having a pattern of protrusions and depressions on a side opposite to the picture layer side extending from the surface protective layer side of the transparent resin film to the surface on the opposite side of the adhesion primer layer on which such a protrusion is present,
    the decorative board further comprising at least one layer containing an ultraviolet absorber between the picture layer and the thermoplastic resin layer,
    wherein the transparent resin film has a thickness of 140 μm or larger, and has a pattern of protrusions and depressions on the picture layer side, and
    the picture layer does not have a pattern of protrusions and depressions synchronized to the pattern of protrusions and depressions of the picture layer side of the transparent resin film.

2. The decorative board according to claim 1,
    wherein the transparent resin film has a thickness at a depression of the pattern of protrusions and depressions of 80 μm or larger.

3. The decorative board according to claim 2, further comprising an adhesive layer between the picture layer and the transparent resin film.

4. The decorative board according to claim 2,
further comprising the adhesion primer layer on the picture layer side of the thermoplastic resin layer.

5. The decorative board according to claim 1,
wherein the pattern of protrusions and depressions on the picture layer side of the transparent resin film has an Rzmax defined in JIS B 0601 (2001) of 80 μm or smaller.

6. The decorative board according to claim 1, further comprising an adhesive layer between the picture layer and the transparent resin film.

7. The decorative board according to claim 6,
wherein the adhesive layer has a thickness of 10 μm or larger and the thickness is larger than an Rzmax defined in JIS B 0601 (2001) of the pattern of protrusions and depressions on the picture layer side of the transparent resin film.

8. The decorative board according to claim 6,
wherein the adhesive layer is the layer containing an ultraviolet absorber.

9. The decorative board according to claim 8,
wherein the adhesive layer contains an ultraviolet absorber in an amount of 0.5% by mass or more and 2% by mass or less.

10. The decorative board according to claim 8,
wherein the ultraviolet absorber in the adhesive layer is a triazine ultraviolet absorber.

11. The decorative board according to claim 1,
further comprising the adhesion primer layer on the picture layer side of the thermoplastic resin layer.

12. The decorative board according to claim 11,
wherein the adhesion primer layer is the layer containing an ultraviolet absorber.

13. The decorative board according to claim 12,
wherein the ultraviolet absorber in the adhesion primer layer is a triazine ultraviolet absorber.

14. The decorative board according to claim 11,
wherein the adhesion primer layer has a thickness of 0.5 μm or larger and 10 μm or smaller.

15. A method for producing the decorative board according to claim 1, the method comprising:
forming an adhesive layer on the picture side layer of the transparent resin film; and
bonding the transparent resin film and the picture layer with the adhesive layer.

16. A method for producing the decorative board according to claim 2, the method comprising:
forming an adhesive layer on the picture side layer of the transparent resin film; and
bonding the transparent resin film and the picture layer with the adhesive layer.

* * * * *